(12) United States Patent
Lerner

(10) Patent No.: US 6,977,727 B2
(45) Date of Patent: *****Dec. 20, 2005

(54) COMPACT IMAGING SPECTROMETER UTILIZING IMMERSED GRATINGS

(75) Inventor: Scott A. Lerner, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 10/680,847

(22) Filed: Oct. 6, 2003

(65) Prior Publication Data

US 2005/0248760 A1    Nov. 10, 2005

(51) Int. Cl.[7] .................................................. G01J 3/28
(52) U.S. Cl. ..................................................... 356/328
(58) Field of Search ............................. 356/305, 326, 356/328, 331, 332, 333, 334; 250/339.07

(56) References Cited

U.S. PATENT DOCUMENTS

| | | |
|---|---|---|
| 5,127,728 A | 7/1992 | Warren et al. |
| 5,717,487 A | 2/1998 | Davies |
| 5,781,290 A | 7/1998 | Bittner et al. |
| 5,880,834 A | 3/1999 | Chrisp |
| 6,016,220 A | 1/2000 | Cook |
| 6,078,048 A | 6/2000 | Stevens et al. |
| 6,100,974 A | 8/2000 | Reininger |
| 6,122,051 A | 9/2000 | Ansley et al. |
| 6,266,140 B1 | 7/2001 | Xiang et al. |
| 6,388,799 B1 | 5/2002 | Arnone et al. |
| 6,538,737 B2 | 3/2003 | Sandstrom et al. |
| 2002/0101587 A1 | 8/2002 | Wilson et al. |
| 2002/0136770 A1 | 9/2002 | Lewis et al. |
| 2003/0016355 A1 | 1/2003 | Koike et al. |

FOREIGN PATENT DOCUMENTS

WO    WO 99/63311    12/1999

*Primary Examiner*—F. L. Evans
(74) *Attorney, Agent, or Firm*—Eddie E. Scott; Alan H. Thompson

(57) ABSTRACT

A compact imaging spectrometer comprising an entrance slit for directing light, lens means for receiving the light, refracting the light, and focusing the light; an immersed diffraction grating that receives the light from the lens means and defracts the light, the immersed diffraction grating directing the detracted light back to the lens means; and a detector that receives the light from the lens means.

14 Claims, 3 Drawing Sheets

COMPACT IMAGING SPECTROMETER UTILIZING IMMERSED GRATINGS

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a spectrometer and more particularly to a compact refractive imaging spectrometer.

2. State of Technology

U.S. Pat. No. 5,717,487 issued Feb. 10, 1998 to Donald W. Davies, and assigned to TRW Inc., provides the following state of technology information, "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom. Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool."

U.S. patent application No. 20020135770 published Sep. 26, 2003 by E. Neil Lewis and Kenneth S. Haber for a Hybrid Imaging Spectrometer, provides the following state of technology information, "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 issued Jun. 20, 2000 to Charles G. Stevens and Norman L. Thomas for an immersion echelle spectrograph, assigned to The Regents of the University of California, provides the following state of technology information, "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 cm.sup.-1. This provides for maximum sensitivity to simple molecules with the narrowest spectral features, allows for corrections for the presence of atmospheric constituents, maximizing species selectivity, and provides greater opportunity to detect unanticipated species. Fourier transform spectrometers, such as Michelson interferometers, have long been the instrument of choice for high resolution spectroscopy in the infrared spectral region. This derives from its advantage in light gathering power and spectral multiplexing over conventional dispersive spectrometers. For remote sensing applications and for those applications in hostile environments, the Fourier transform spectrometer, such as the Michelson interferometer, is ill suited for these applications due to the requirements for keeping a moving mirror aligned to better than a wavelength over the mirror surface. Furthermore, this spectrometer collects amplitude variations over time that are then transformed into frequency information for spectral generation. Consequently, this approach requires stable radiation sources and has difficulty dealing with rapidly changing reflectors or emissions as generally encountered in remote field observations, particularly from moving observation platforms. Furthermore, under conditions where the noise terms are dominated by the light source itself, the sensitivity of the instrument is limited by the so-called multiplex disadvantage."

U.S. Pat. No. 5,880,834 issued Mar. 9, 1999 to Michael Peter Chrisp for a convex diffraction grating imaging spectrometer, assigned to The United States of America as represented by the Administrator of the National Aeronautics and Space Administration, provides the following state of technology information, "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a compact refractive imaging spectrometer. The compact imaging spectrometer comprises an entrance slit for directing light, lens means for receiving the light, refracting the light, and focusing the light; an immersed diffraction grating that receives the light from the lens means and defracts the light, the immersed diffraction grating directing the detracted light back to the lens means; and a detector that receives the light from the lens means.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
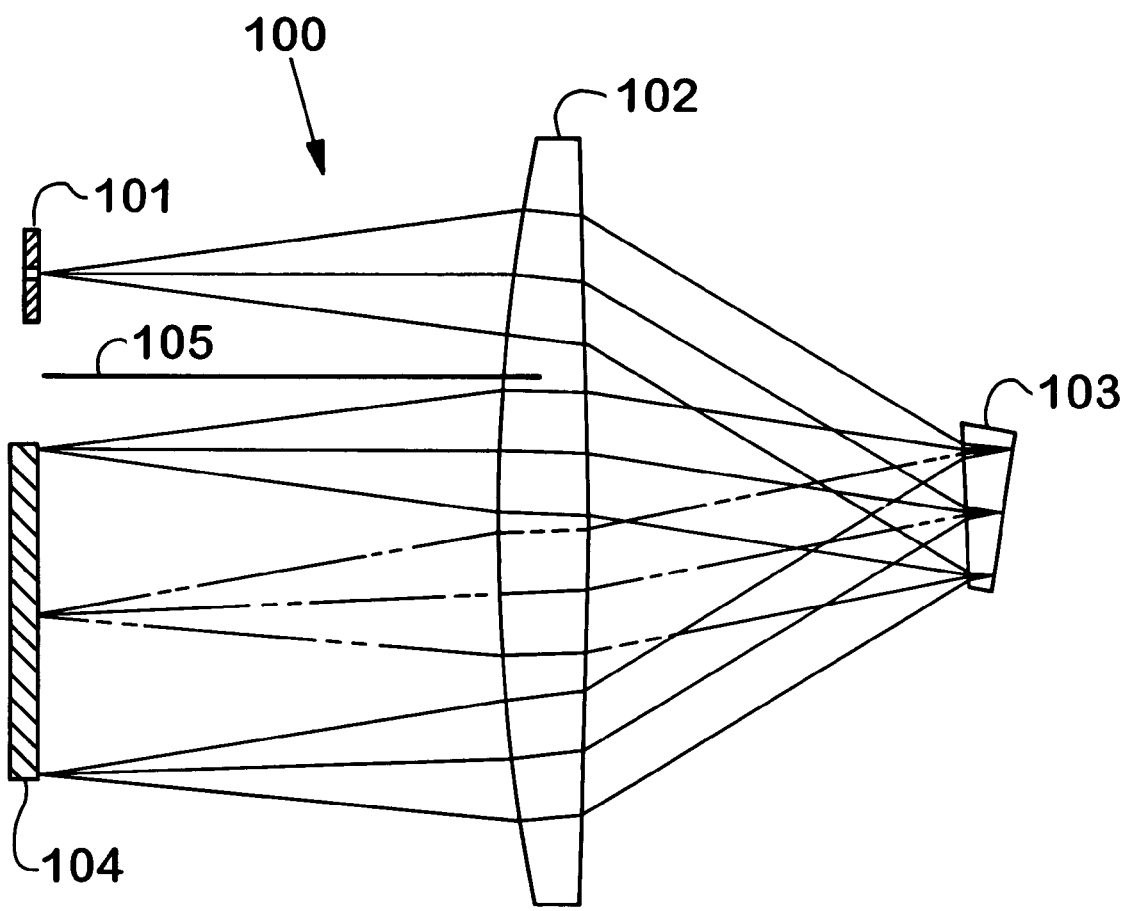
FIG. 1 is a raytrace illustrating an embodiment of a compact imaging spectrometer constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides a compact imaging spectrometer based on a lens and an immersed diffraction grating. Small size for an imaging spectrometer is extremely important because it determines the requirements for the cryogenic cooling. If the spectrometer is small it can fly in a small UAV. Also, if the spectrometer is small it is person portable. Referring to FIG. 1 of the drawings, an embodiment of a compact imaging spectrometer constructed in accordance with the present invention is illustrated. This embodiment of the present invention is designated generally by the reference numeral 100.

FIG. 1 is a raytrace for the imaging spectrometer 100. The structural elements in the compact imaging spectrometer 100 include slit 101, lens 102, immersed diffraction grating 103, 2D detector 104, and baffle 105. The imaging spectrometer 100 has a size envelope that is smaller than spectrometers currently in use. The slit 101, lens 102, immersed diffraction grating 103, and 2D detector 104 fit within the envelope. The envelope is 3.5 cm by 1.9 cm by 1.2 cm or smaller.

Figure 2:
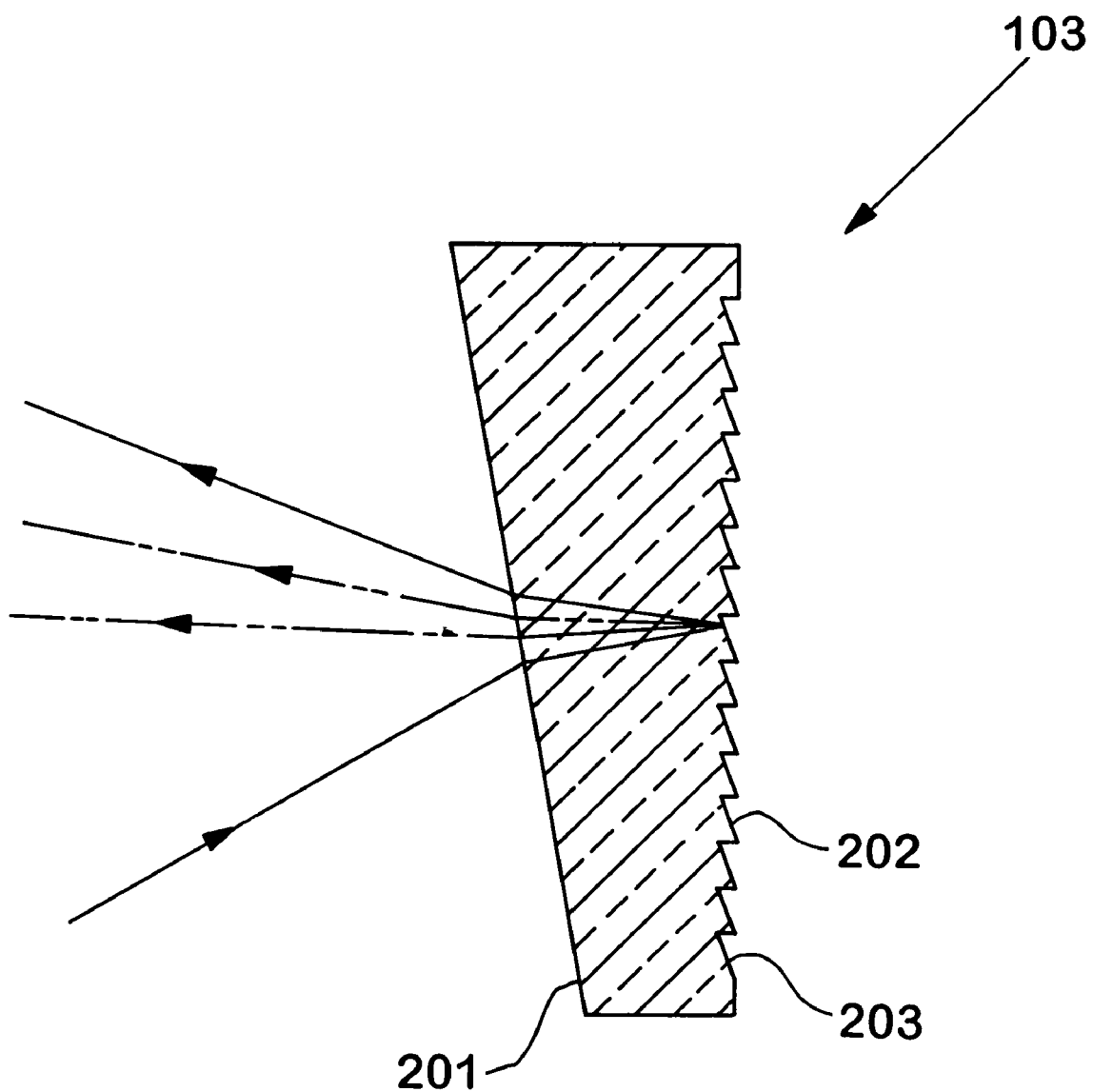
FIG. 2 shows the immersed diffraction grating in greater detail.

Referring now to FIG. 2, the immersed diffractive grating 103 is shown in greater detail. The immersed diffractive grating material is Germanium. Light enters from the front germanium surface 201 and then passes through the germanium to diffraction off the grating rulings 202 at the back surface 203. The diffracted light then propagates through the germanium and out. The grating is cut on the back of a wedged prism. The refractive faces of the prism may be spherical, aspheric, or plano. Although grating is cut into germanium in the design, other materials such as zinc selenide are also suitable. The immersed diffractive grating 103 has 115 lines/mm.

Referring again to FIG. 1, light goes from the entrance slit 101 to the lens 102, which refracts it to the ruled germanium grating 103. The diffracted order then propagates back to the lens 102, which focuses onto the 2D detector array 103. The germanium grating 103 is a wedged prism that is plano on both faces and with the grating ruled on the flat reflective side. The baffle 104 mitigates stray light at the detector 104.

The compact imaging spectrometer 100 is diffraction limited over the wavelength ranges with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth off a pixel over the full wavelength range. This means that the spectrum from a single point in the entrance slit will not wander from the center of a row pixels by less than ±2 microns for the compact imaging spectrometer 100. Correcting the spectral slit curvature and the spatial mapping distortion with wavelength to less than one tenth of a pixel ensures that the images does not have to be resampled to correct for these effects.

The cold stop in the compact imaging spectrometer 100 is at the germanium grating. This ensures that the warm back radiation from outside the spectrometer entrance slit does not reach the detector array. This would cause and unacceptable degradation in the signal to noise ratio. The geometry of the compact imaging spectrometer 100 allows a transmissive cold stop to be used ahead of the grating, for even better thermal background reduction, but this also increases the grating sizes.

The compact imaging spectrometer 100 solves the requirements for compact imaging spectrometers meeting the performance requirements given in Table 1. Small size is extremely important because it determines the requirements for the cryogenic cooling and also if the spectrometer can fly in a small UAV or if the spectrometer is person portable.

TABLE 1

| (Imaging Spectrometer Performance) | |
|---|---|
| Spectral Range | 8–13.5 microns |
| F-number | 4 |
| Detector array | 256 spatial × 256 spectral |
| Pixel size | 40 microns |
| Entrance slit length | 10.24 mm |
| Spatial distortion: change in spatial mapping with wavelength | <0.1 pixel (<±2 microns) |
| Spectral distortion: spectral smile | <0.1 pixel (<t2 microns) |
| Optical performance | Diffraction limited |

The compact imaging spectrometer 100 is smaller than those currently in use and the cryogenic cooling requirements have been reduced thereby enabling its use in small unmanned aerial vehicles and for man portable instruments. The compact imaging spectrometer 100 can be utilized for remote sensing imaging spectrometers where size and weight are of primary importance. The compact imaging spectrometer 100 has very good spectral and spatial registration providing accurate spectral data for spectral algorithm retrievals. This avoids having to resample the images to correct for these defects, which has the disadvantage of creating spectral mixing between pixels reducing the sensitivity and accuracy of the retrieval algorithms.

Figure 3:
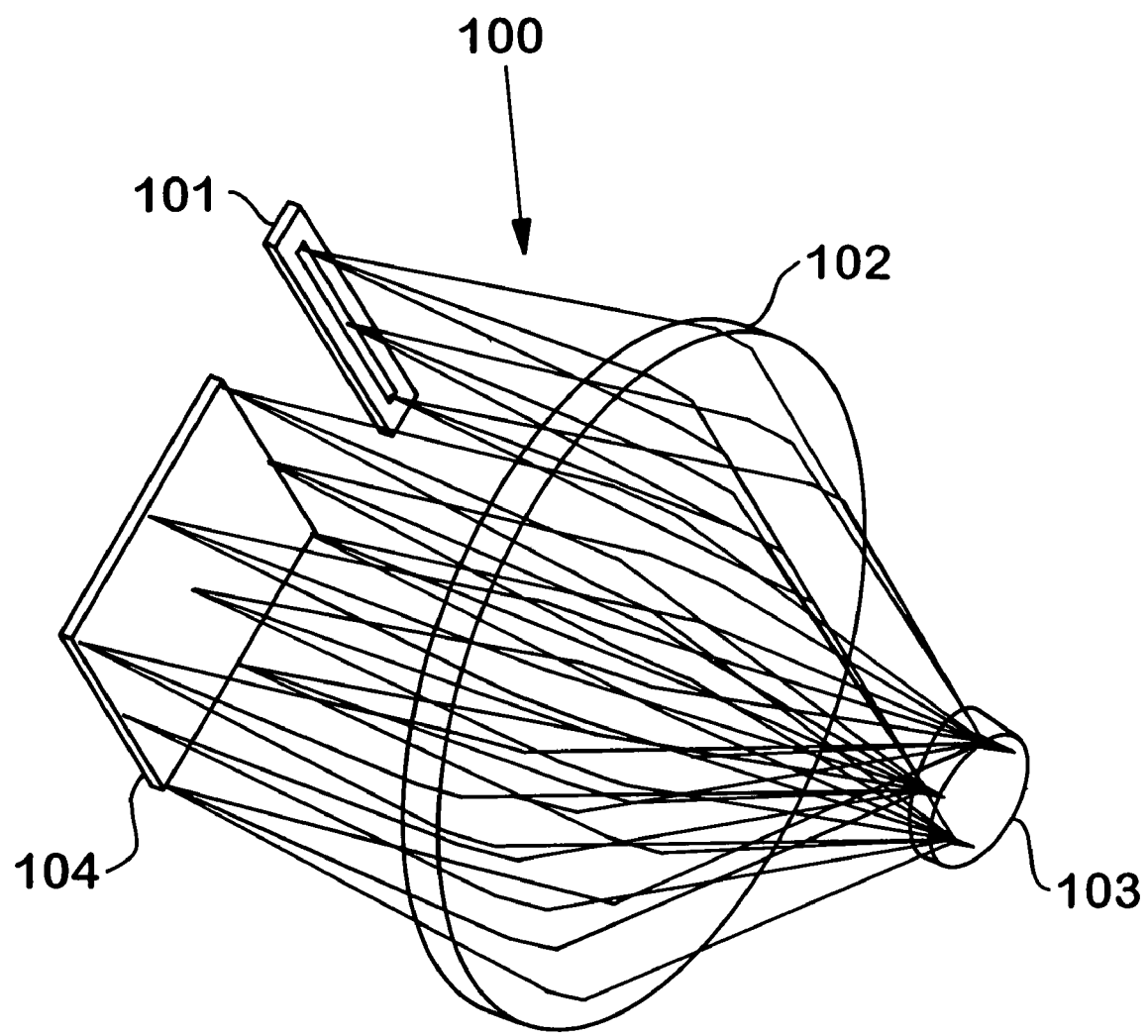
FIG. 3 is a perspective view of the raytrace illustrating the embodiment of a compact imaging spectrometer constructed in accordance with the present invention shown in FIG. 1.

The compact imaging spectrometer 100 uses smaller cryogenic coolers facilitating their using in portable (man carried) gas detection systems and in small unmanned aerial vehicles for remote gas detection. The compact imaging spectrometer 100 has application for homeland defense to check for the presence of biological or chemical weapons without entering the contaminated areas. The compact imaging spectrometer 100 also has application for the covert remote sensing of sites not accessible to United States forces. The compact imaging spectrometer 100 can be used for commercial remote sensing where portability is important. The compact imaging spectrometer 100 can be used for pollution detection, and remote sensing of agricultural crops, and geological identification. The compact imaging spectrometer 100 can also be used for the remote monitoring of industrial processes. Referring now to FIG. 3, a perspective view of the raytrace for the compact imaging spectrometer 100 is shown. The compact refractive imaging spectrometer 100 comprising an entrance slit 101 for directing light, lens means 102 for receiving the light and refracting the light, an immersed diffraction grating 103 that receives the light from the lens means 102 and defracts the light, the immersed diffraction grating 103 for directing the detracted light back to the lens means 102, and a detector 104 that receives the light from the lens means 102. The imaging spectrometer 100 has a front and a back. The slit 101, the lens means 102, the immersed diffraction grating 103, and the detector 104 fit within an envelope located between the front and the back. The envelope is 3.5 cm by 1.9 cm by 1.2 cm or smaller. In the compact imaging spectrometer 100, the lens 102 is ahead of the grating 103. The lens for receiving light, refracting light, and focusing light is a Germanium lens. The lens has a surface and is an anamorphic asphere on its surface. The lens in one embodiment consists of two or more lenses that are coaxial. Light goes from the entrance slit 101 to the lens 102, which refracts it to the ruled germanium grating 102. The diffracted order then propagates back to the lens 102, which focuses onto the 2D detector array 103. The germanium grating 103 is a wedged prism that is plano on both faces and with the grating ruled on the flat reflective side. In one embodiment the immersed diffraction grating has a refractive surface and is an anamorphic asphere on its refractive surface. In one embodiment the immersed diffraction grating has a grating surface and is spherical or aspheric on its grating surface. In one embodiment the immersed grating consists of two or more prisms.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A compact imaging spectrometer apparatus, comprising:
   an entrance slit for directing light,
   lens means for receiving said light, refracting said light, and focusing said light;
   an immersed diffraction grating that receives said light from said lens means and defracts said light, said immersed diffraction grating directing said defracted light back to said lens means; and
   a detector that receives said light from said lens means.

2. The compact imaging spectrometer apparatus of claim 1 wherein said lens means for receiving said light, refracting said light, and focusing said light is a Germanium lens.

3. The compact imaging spectrometer apparatus of claim 1 wherein said immersed diffraction grating has rulings in a germanium surface.

4. The compact imaging spectrometer apparatus of claim 1 wherein said immersed diffraction grating has 115 lines/mm.

5. The compact imaging spectrometer apparatus of claim 1 wherein said imaging spectrometer apparatus has a front and a back and wherein said slit, said lens means, said immersed diffraction grating, and said detector fit within an envelope located between said front and said back.

6. The compact imaging spectrometer apparatus of claim 5 wherein said envelope is 3.2 cm by 1.9 cm by 1.2 cm or smaller.

7. The compact imaging spectrometer apparatus of claim 1 wherein said detector is a 2D detector.

8. The compact imaging spectrometer apparatus of claim 1 wherein said immersed diffraction grating has a refractive surface and is spherical or aspheric on its refractive surface.

9. The compact imaging spectrometer apparatus of claim 1 wherein said immersed diffraction grating has a refractive surface and is an anamorphic asphere on its refractive surface.

10. The compact imaging spectrometer apparatus of claim 1 wherein said immersed diffraction grating has a grating surface and is spherical or aspheric on its grating surface.

11. The compact imaging spectrometer apparatus of claim 1 wherein said lens means has a surface and is an anamorphic asphere on its surface.

12. The compact imaging spectrometer apparatus of claim 1 wherein said immersed grating consists of 2 or more prisms.

13. The compact imaging spectrometer apparatus of claim 1 wherein said lens means consists of two or more lenses that are coaxial.

14. The compact imaging spectrometer apparatus of claim 1 wherein said lens means consists of two or more lenses that are not coaxial.

* * * * *